May 28, 1940.    O. SCHLÄPFER    2,202,604
MOTOR CONTROL SYSTEM
Filed Jan. 22, 1938
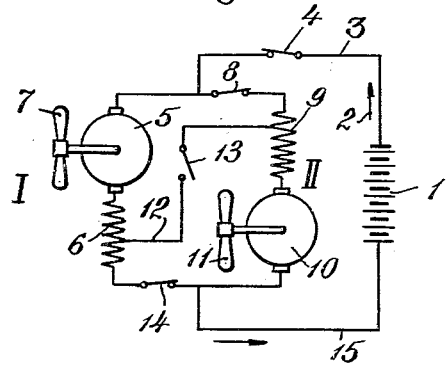
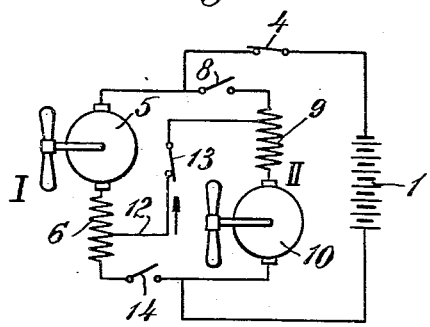
INVENTOR
Oscar Schläpfer
BY
Pennie Davis Marvin & Edmonds
ATTORNEY Patented May 28, 1940

2,202,604

UNITED STATES PATENT OFFICE 2,202,604

MOTOR CONTROL SYSTEM

Oscar Schläpfer, Winterthur, Switzerland, assignor to Sulser Frères Société Anonyme, Winterthur, Switzerland Application January 22, 1938, Serial No. 186,278
In Switzerland January 23, 1937

2 Claims. (Cl. 172—179)

This invention relates to a method of connecting series-wound or compound-wound electric motors which can be connected in series or in parallel. More particularly this invention relates to a method or system of connecting electric motors in series and in parallel characterized in that the full field of each motor is utilized when the motors are connected in parallel and in that when the motors are connected in series at least one of the motors utilizes only a portion of its field, that is, at least one of the motors operates with a tapped field.

The invention is diagrammatically illustrated by way of example in the accompanying drawing, in which, Figs. 1 and 2 are diagrammatic illustrations of electrical apparatus embodying the invention.

The battery 1 supplies current to the conductor 3 in the direction of the arrow 2. Through a switch 4, the rotor 5 and the series winding 6 of the motor I, which drives for example a fan 7, receive current; likewise through the closed switch 8, current is received by the motor II with the series winding 9 and the rotor 10, and driving for example a fan 11. The current flows back to the battery 1 through the conductor 15.

In the case of the arrangement according to Figure 1, the switches 8 and 14 are closed, while the switch 13 is open. According to the invention, when connected in series as shown in Figure 2, at least one of the motors is connected to another motor by means of a tapping 12, shown schematically in the drawing, through the switch 13. The tappings of windings 6 and 9 produce a reduction of the field of their respective motors and, in accordance with well-known principles, produce an increase in the speed of the motors. Thus, by selection of different tappings in windings 6 and 9, as shown schematically in Fig. 2, the speeds of the two motors, when connected in series, may be varied not only with respect to one another but also in respect to their speeds when the motors are connected in parallel as shown in Fig. 1.

From the figures it can be clearly seen that the mentioned advantages of the method of connecting in series with field tapping are obtained without requiring additional switches. In the example shown, the motors are assumed to be series wound. The method of connection can however be adopted also for compound-wound motors, the compound winding being tapped when connected in series.

Series-parallel control is a well-known method of regulating the speed of electric motors but has the drawback that, when connected in parallel or in series, the speeds bear a certain fixed proportion to each other, and that when changing from one such connection to the next, the difference in speed is so great that in many cases such systems of control can not be used. For example, when two motors and their respective field windings are connected in parallel a definite speed is obtained by each motor, but when the motors are then connected in series the voltage previously imposed on each motor is distributed between the two motors with a resulting serious decrease in the speeds of the motors. According to this invention these drawbacks are eliminated by the use of a conductor between the fields and switches arranged to connect to taps on the fields with the result that the field strength of the motors is decreased. By this method or system the speed of the motors having reduced field strength, when connected in series, is not so greatly reduced below that of parallel-operation as would be the case if connected in series with full field.

By connection to the proper taps of field windings 6 and 9 the speed of each motor, when connected in series, may be a different percentage of the speed of each motor when connected in parallel or, if the motors are of different powers,—so that, when connected in series in the usual manner, the proportion between the speeds of the two motors would not be the same,—it is possible, by connecting the motors in series between appropriate taps on windings 6 and 9, to obtain speeds which, when connected in series, are in both motors in the same proportion as the speeds of the motors when connected in parallel.

I claim:

1. Electrical apparatus which comprises a power circuit, two series-wound motors, each of said motors having a tapped field winding, a conductor connecting the armature of one motor to the field of the other motor and to one lead of the power circuit, a second conductor connecting the armature of the last mentioned motor to the field of the first mentioned motor and to the other lead of the power circuit, a third conductor connecting the tappings of the two fields, and a switch in each conductor whereby the switches may be arranged to connect the motors in parallel in the power circuit so as to pass current through the entire field of each motor, or in series so as to pass current through only a part of each field.

2. Electric apparatus which comprises a power circuit, two series-wound motors each having a tapped field winding, two conductors for placing the motors in parallel in the power circuit, a third conductor interconnecting the tappings of the fields of the two motors, and a switch disposed in each conductor whereby the switches may be arranged to connect the motors in parallel in the power circuit so as to pass current through the entire field winding of each motor or to connect the motors in series in the power circuit so as to pass current through only a part of each field winding of the motors.

OSCAR SCHLÄPFER.